(12) United States Patent
Sar et al.

(10) Patent No.: US 8,555,193 B2
(45) Date of Patent: Oct. 8, 2013

(54) SYSTEM FOR INTELLIGENT AUTOMATED LAYOUT AND MANAGEMENT OF INTERACTIVE WINDOWS

(75) Inventors: Can Sar, Stanford, CA (US); Jesse Young, Belmont, CA (US); Tristan Harris, San Francisco, CA (US)

(73) Assignee: Google Inc., Mountain View, CA (US)

( * ) Notice: Subject to any disclaimer, the term of this patent is extended or adjusted under 35 U.S.C. 154(b) by 946 days.

(21) Appl. No.: 12/321,595

(22) Filed: Jan. 21, 2009

(65) Prior Publication Data

US 2010/0011316 A1  Jan. 14, 2010

Related U.S. Application Data

(60) Provisional application No. 61/011,635, filed on Jan. 17, 2008.

(51) Int. Cl.
*G06F 3/0481* (2013.01)

(52) U.S. Cl.
USPC ............ 715/781; 715/788; 715/792; 715/771; 715/764; 715/802

(58) Field of Classification Search
USPC ........................................................ 715/781
See application file for complete search history.

(56) References Cited

U.S. PATENT DOCUMENTS

| | | | | |
|---|---|---|---|---|
| 5,371,847 A | * | 12/1994 | Hargrove | 715/788 |
| 5,390,295 A | * | 2/1995 | Bates et al. | 715/789 |
| 5,420,605 A | * | 5/1995 | Vouri et al. | 345/698 |
| 5,561,757 A | * | 10/1996 | Southgate | 715/790 |
| 5,657,463 A | * | 8/1997 | Bingham | 715/799 |
| 5,712,995 A | * | 1/1998 | Cohn | 715/792 |
| 5,838,318 A | * | 11/1998 | Porter et al. | 715/790 |
| 5,874,962 A | * | 2/1999 | de Judicibus et al. | 715/789 |
| 5,889,517 A | * | 3/1999 | Ueda et al. | 715/803 |
| 6,008,809 A | * | 12/1999 | Brooks | 715/792 |
| 6,230,171 B1 | | 5/2001 | Pacifici et al. | |
| 6,253,254 B1 | | 6/2001 | Erlenkoetter et al. | |
| 6,356,908 B1 | * | 3/2002 | Brown et al. | 1/1 |
| 6,434,568 B1 | | 8/2002 | Bowman-Amuah | |
| 6,549,217 B1 | * | 4/2003 | De Greef et al. | 715/745 |
| 6,654,034 B1 | * | 11/2003 | Kanevsky et al. | 715/764 |
| 6,927,757 B2 | * | 8/2005 | Junkins et al. | 345/158 |
| 6,957,395 B1 | * | 10/2005 | Jobs et al. | 715/765 |
| 6,970,873 B2 | | 11/2005 | Fu et al. | |
| 7,275,063 B2 | * | 9/2007 | Horn | 1/1 |
| 7,409,633 B2 | | 8/2008 | Lerner et al. | |
| 7,421,448 B2 | | 9/2008 | Spork | |
| 7,681,143 B2 | * | 3/2010 | Lindsay et al. | 715/788 |
| 7,739,617 B2 | * | 6/2010 | Ording et al. | 715/790 |
| 7,747,965 B2 | * | 6/2010 | Holecek et al. | 715/781 |
| 7,836,148 B2 | | 11/2010 | Popp et al. | |
| 7,844,956 B2 | | 11/2010 | Rojer | |

(Continued)

OTHER PUBLICATIONS

Working screenshot of windows explorer of Windows Vista by Microsoft, released on Jan 30, 2007, 19 pages.*

(Continued)

*Primary Examiner* — William Bashore
*Assistant Examiner* — Reza Nabi
(74) *Attorney, Agent, or Firm* — Sterne, Kessler, Goldstein & Fox P.L.L.C.

(57) ABSTRACT

The present invention relates to the automated layout and scrolling of windows.

18 Claims, 9 Drawing Sheets

(56) References Cited

U.S. PATENT DOCUMENTS

| | | | |
|---|---|---|---|
| 7,849,437 B2 | 12/2010 | Isaacs et al. | |
| 7,913,183 B2 * | 3/2011 | Czerwinski et al. | 715/779 |
| 2002/0054141 A1 * | 5/2002 | Yen et al. | 345/804 |
| 2002/0175933 A1 * | 11/2002 | Ronkainen et al. | 345/727 |
| 2003/0081000 A1 | 5/2003 | Watanabe et al. | |
| 2004/0056894 A1 * | 3/2004 | Zaika et al. | 345/762 |
| 2004/0261038 A1 * | 12/2004 | Ording et al. | 715/792 |
| 2005/0041025 A1 * | 2/2005 | Masters et al. | 345/427 |
| 2005/0073601 A1 * | 4/2005 | Battles et al. | 348/333.05 |
| 2005/0086597 A1 * | 4/2005 | Duperrouzel et al. | 715/526 |
| 2005/0198202 A1 | 9/2005 | Yamamoto | |
| 2005/0256866 A1 | 11/2005 | Lu et al. | |
| 2006/0013462 A1 * | 1/2006 | Sadikali | 382/132 |
| 2006/0036962 A1 * | 2/2006 | Jobs et al. | 715/765 |
| 2006/0048047 A1 | 3/2006 | Tao | |
| 2006/0061550 A1 * | 3/2006 | Fateh | 345/158 |
| 2006/0075205 A1 | 4/2006 | Martin et al. | |
| 2006/0085760 A1 * | 4/2006 | Anderson et al. | 715/778 |
| 2006/0161861 A1 * | 7/2006 | Holecek et al. | 715/782 |
| 2006/0200779 A1 * | 9/2006 | Taylor | 715/781 |
| 2006/0212509 A1 | 9/2006 | Feigenbaum et al. | |
| 2006/0242602 A1 * | 10/2006 | Schechter et al. | 715/838 |
| 2006/0248404 A1 * | 11/2006 | Lindsay et al. | 714/38 |
| 2006/0248471 A1 * | 11/2006 | Lindsay et al. | 715/800 |
| 2006/0294475 A1 * | 12/2006 | Holecek et al. | 715/781 |
| 2007/0022135 A1 | 1/2007 | Malik | |
| 2007/0022389 A1 * | 1/2007 | Ording et al. | 715/790 |
| 2007/0162414 A1 | 7/2007 | Horowitz et al. | |
| 2007/0174762 A1 | 7/2007 | Plant | |
| 2007/0245400 A1 | 10/2007 | Paek et al. | |
| 2007/0250788 A1 * | 10/2007 | Rigolet | 715/788 |
| 2007/0288863 A1 * | 12/2007 | Ording et al. | 715/788 |
| 2008/0036743 A1 * | 2/2008 | Westerman et al. | 345/173 |
| 2008/0046845 A1 | 2/2008 | Chandra | |
| 2008/0052945 A1 * | 3/2008 | Matas et al. | 34/173 |
| 2008/0147841 A1 | 6/2008 | Nishino et al. | |
| 2008/0168382 A1 * | 7/2008 | Louch et al. | 715/781 |
| 2009/0192849 A1 * | 7/2009 | Hughes et al. | 705/7 |
| 2009/0199077 A1 * | 8/2009 | Sar et al. | 715/201 |
| 2009/0199083 A1 * | 8/2009 | Sar et al. | 715/231 |
| 2009/0282359 A1 * | 11/2009 | Saul et al. | 715/784 |
| 2010/0011313 A1 * | 1/2010 | Sauve et al. | 715/777 |
| 2010/0011316 A1 * | 1/2010 | Sar et al. | 715/784 |
| 2010/0017748 A1 * | 1/2010 | Taylor et al. | 715/788 |
| 2010/0281420 A1 * | 11/2010 | Taylor | 715/781 |
| 2010/0313165 A1 * | 12/2010 | Louch et al. | 715/792 |
| 2011/0023017 A1 | 1/2011 | Calvin | |

OTHER PUBLICATIONS

U.S. Appl. No. 12/321,596, Sar et al., "Creating First Class Objects from Web Resources," filed Jan. 21, 2009.

U.S. Appl. No. 12/321,597, Sar et al., "Method of enabling the modification and annotation of a webpage from a web browser," filed on Jan. 21, 2009.

Office Action mailed on Mar. 4, 2011, in U.S. Appl. No. 12/321,596, Sar et al., filed Jan. 21, 2009.

Office Action mailed on Mar. 16, 2011, in U.S. Appl. No. 12/321,597, Sar et al., filed Jan. 21, 2009.

\* cited by examiner

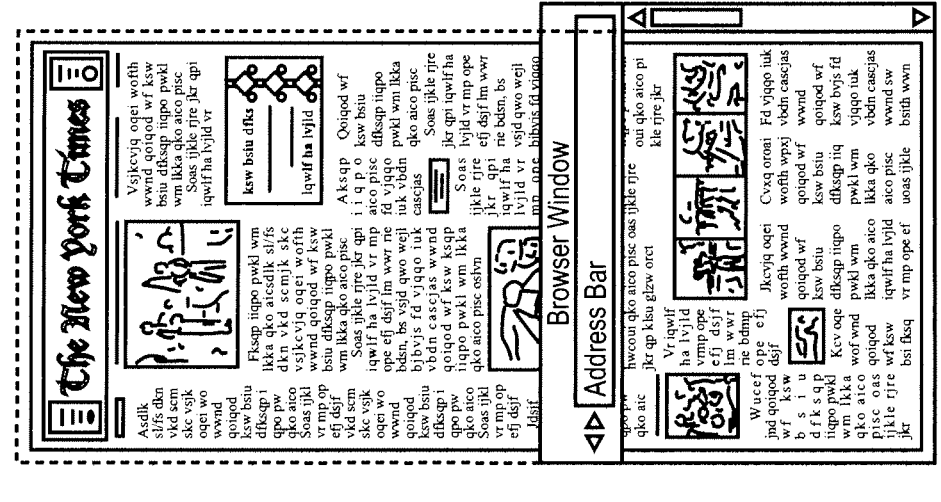
FIG. 2A
FIG. 2B
FIG. 2C

SYSTEM FOR INTELLIGENT AUTOMATED LAYOUT AND MANAGEMENT OF INTERACTIVE WINDOWS

This application is related to and claims priority from U.S. Provisional Application No. 61/011,635, filed Jan. 17, 2008, and entitled "System For Intelligent Automated Layout And Management Of Interactive Windows", the contents of which are expressly incorporated by reference herein.

BACKGROUND

The media viewing environment consists of a core piece of technology called the intelligent window layout manager. This media viewing layout manager according to the present invention (See FIG. 1) automatically positions and organizes the constrained and extendable media windows and achieves a different type of user experience than has previously been available in a web browser. The system does this by allowing users to explore multiple "windows" easily without needing to open an additional browser window, grant more viewing space when necessary, and remove the added viewing space to save users time cleaning up and managing their viewing space.

Historically, window managers have operated by primarily manual interaction, such that users who open, close, move, minimize, maximize, etc windows must do so without any automated help from the computer. Some automatic systems have existed to help users with dragging files over windows that are partially off-screen (and bringing them onscreen for the purposes of the drag drop target, like the Mac OS X Finder), or helping users find windows more easily (Mac OS X's Exposé feature), but none have built a system for automatically managing windows within a constrained, but extendable viewing environment. For example, in the above case of Expose, the premise is that windows accumulate into a clutter of overlapping windows over time and users have difficulty finding a specific window. With Expose, users press a button and the windows all minimize to a thumbnailed version of their size and are positioned so that all are visible in the fixed display resolution of the screen and are non-overlapping. Expose does not assume that the fixed resolution of the screen can be extended, in that it does not create new space outside the fixed resolution of the screen when not enough space is available. Instead, Expose must shrink the windows until they are small enough that all are visible in one constrained but non-extendable resolution of the screen.

SUMMARY

The present invention relates to the automated layout and scrolling of windows. In one aspect is described a method of transforming an appearance of a display of a computer that includes at least one or a plurality of windows, the method of transforming based upon a user commanding the computer to add a new window or to remove an existing window and comprising the steps of:

providing a layout manager program that is executed by a processor of the computer and contains a plurality of instructions to cause the computer to automatically arrange placement of the one or a plurality of windows within a representation of an extensible display area stored in a memory wherein a subset of the representation corresponds to a viewable area corresponding to a visually perceptible viewable area of the display associated with the computer, and an extension area corresponds to a non-viewable area of the representation, wherein the layout manager:

creates a log of the one or the plurality of windows and a scrolled offset of the viewable area, and monitors which one of the one or the plurality of windows is an active window, such that any portion of the one active window that is within the visually perceptible viewable area is displayed and other ones of the plurality of windows that are not the one active window are background windows that are spatially oriented around or behind the one active window, wherein some of the background windows have portions within the visually perceptible viewable area that are behind the active window and are occluded and also portions within the visually perceptible viewable area that are around the active window and are not occluded;

in response to the user commanding the computer to add the new window, the layout manager automatically designating the new window as the active window, and automatically placing the new window within the representation and automatically scrolling the representation so that a portion of the new window is within the visually perceptible viewable area; and in response to the user commanding the computer to remove the existing window, the layout manager automatically determining an immediately previous active window and designating the immediately previous active window as the active window, and automatically scrolling the representation so that a portion of the immediately previous active window is within the visually perceptible viewable area.

In another aspect, there is described a method of transforming an appearance of a display of a computer that includes a window, the method of transforming based upon a user commanding the computer to remove the window comprising the steps of: providing a layout manager program that is executed by a processor of the computer and contains a plurality of instructions to cause the computer to automatically arrange placement of windows within a representation of an extensible display area stored in a memory, wherein a subset of the representation corresponds to a viewable area corresponding to a visually perceptible viewable area of the display associated with the computer, and an extension area corresponds to a non-viewable area of the representation, wherein the layout manager: and in response to the user commanding the computer to remove the window, the layout manager automatically returning the viewable area to a logged offset of an immediately previous view, thereby maintaining a scrolling position of the immediately previous view.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein:

FIG. 2A-2C illustrates constrained and extendable windows.

DETAILED DESCRIPTION OF THE PREFERRED EMBODIMENTS

Described herein is a system that is able to open, layout, manage and close windows inside an scrollable viewport, with automatic functions to reduce the amount of work the user must do to manage his or her viewing environment. A scrollable viewport is any viewing area that has some boundary to the viewing area but that allows scrolling past those boundaries. The 'viewport' as described could be an operating system window, an application window, a computer screen, a browser window, or a windowing system invented inside of one of the systems mentioned (for example, an application that invents a window management system inside of its own application window). A traditional operating system window manager can only display and layout windows within a fixed rectangle display area, set by the current resolution of the screen. Unlike those systems, the media viewing layout manager can use the total space inside the viewport (in our case, the web browser window) in a different way than on a fixed size screen. In the system described herein, (where the viewport is a web browser window), it is the whole web page contained in the window, including the non-visible parts of the page content outside of the window's scrolled viewing region, that compose the possible "canvas" upon which windows can be displayed, manipulated and viewed. (See FIGS. 2A-2C).

Current desktop operating systems may place windows partially outside the viewing area, but the viewing area of the screen does not change in this event (meaning any hidden area of a window places partially outside the viewing area remains hidden and inaccessible).

Figure 1:
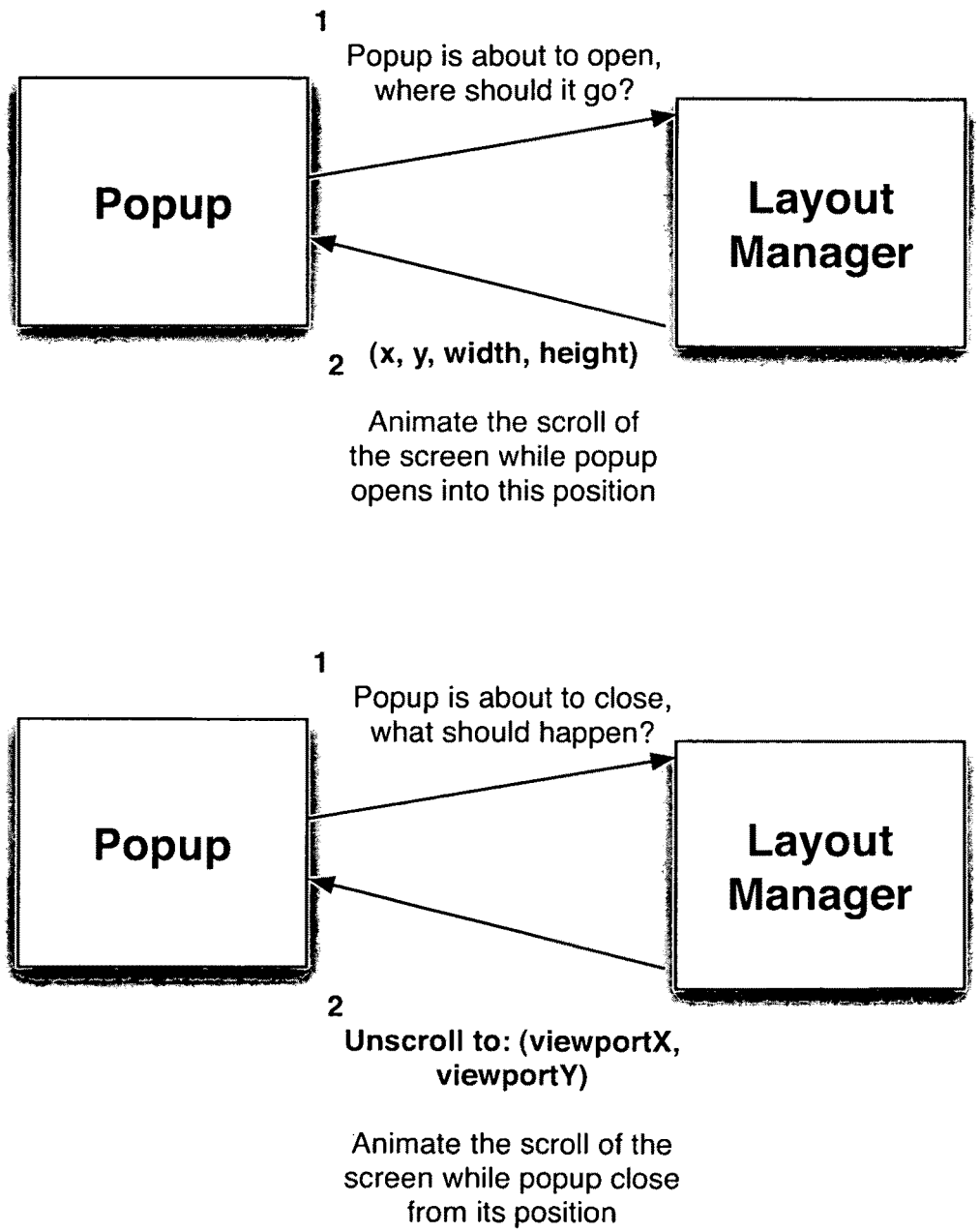
FIG. 1 illustrates an overview of the functions of the layout manager automatically positioning and organizing constrained and extendable media windows.
Figure 3:
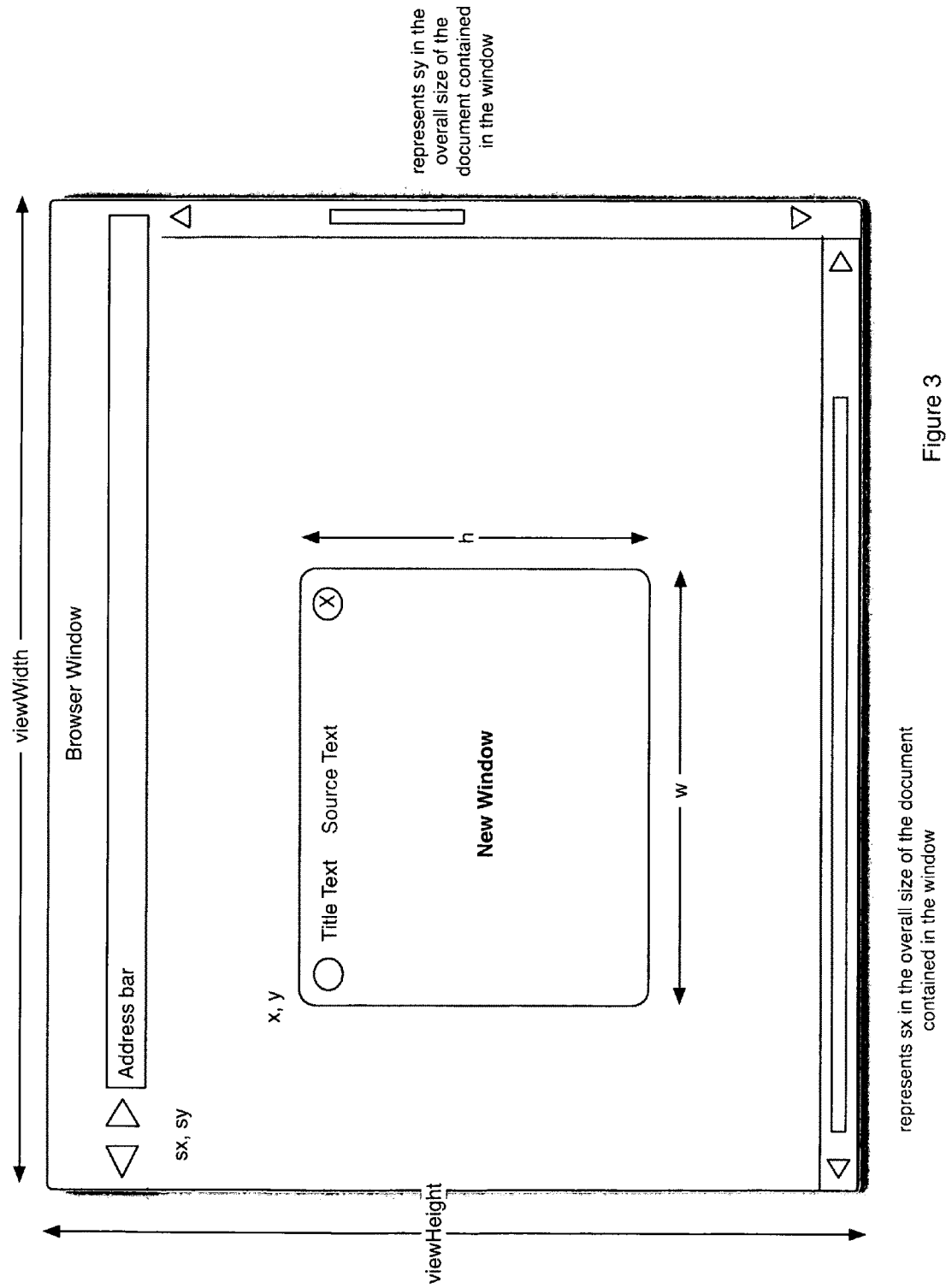
FIG. 3 illustrates placement of a new window.

In the media viewing layout manager according to the present invention, when this is to occur, the manager calls functions to scroll the viewport just enough to make the newly placed window visible. More specifically, assume a "top-left" coordinate system where for each rectangle we are describing, [0,0] references the top-left corner, and any positive numbers reference the down-rightwards direction. If a new window is to appear at a new location x,y with width, w and height, h, and the owning viewport is currently scrolled to position sx, sy, and the height of the owning viewport is viewW, viewH, then we must scroll the window in the following way. (See FIG. 3).

If the new window is to appear above the current viewing region, meaning y<sy, the window manager will scroll the owning viewport from [sy, y].

If the new window is to appear to the left of the current viewing region, meaning x<sx, the window manager will scroll the owning viewport from [sx, x].

If the new window is to appear past the bottom of the current viewing region, meaning y+h>sy+viewH, the window manager will scroll the owning viewport from [sy, y+h−viewH]. This scrolls the window just enough for the window to appear.

If the new window is to appear past the right side of the current viewing region, meaning x+w>sx+viewW, the window manager will scroll the owning viewport from [sx, x+w−viewW]. This scrolls the window just enough for the window to appear.

It's important to note that in the case where the viewport must scroll beyond the current viewable area, the manager may also grant additional space that may not be previously exist. For example, if the window manager scrolled a browser window downwards to accommodate for a new window placed just slightly beyond the bottom side of the viewport, it may be the case that the current viewport actually does not extend beyond the current view. More specifically, if scrollbars were associated with this viewport, the scroll marker would be at the bottom of the scrollable area indicating the end of the viewable area (See the third window state in FIG. 2C). Alternatively, if no scrollbars were associated with the viewport, this would also indicate the end of the viewable area. In this case, our manager will grant new space for whatever new area is necessary in the viewport to display the bottom of this window (y+height). In the example of a window extending beyond the bottom side of the viewport, new space would be vertically increased by y+h−totalHeightOfScrollableIncludingHiddenViewingAreaInViewport (See FIGS. 2A-2C and FIG. 3). Sometimes expanding and collapsing the viewport in this way is performed automatically by the computer operating system, or web browser whenever the internal content of the window is changed We chose not to create additional space for laying out windows above, or to the left of the top-right 0,0 coordinate of the window because it didn't feel natural, but other implementations could easily add do the same computation using the top-left boundaries instead of the bottom-right ones.

In this way, as new windows become visible, the owning viewport gracefully scrolls to accommodate them. It is important to note that the scroll does not happen immediately, but gradually between the two endpoints specified above. In the present invention, this happens by executing a sinusoidal animation function thirty frames per second on a timer, over a duration of 500 ms that moves the owning viewport's scroll region each time the timer fires. This automatic scrolling can occur with or without the animation, including variations in duration, animation function, or frames per second, etc. Variations on the exact scroll endpoints are also possible, since animating to exactly to the positions specified herein may not occur, but to those positions +/− some padding.

Figure 4:
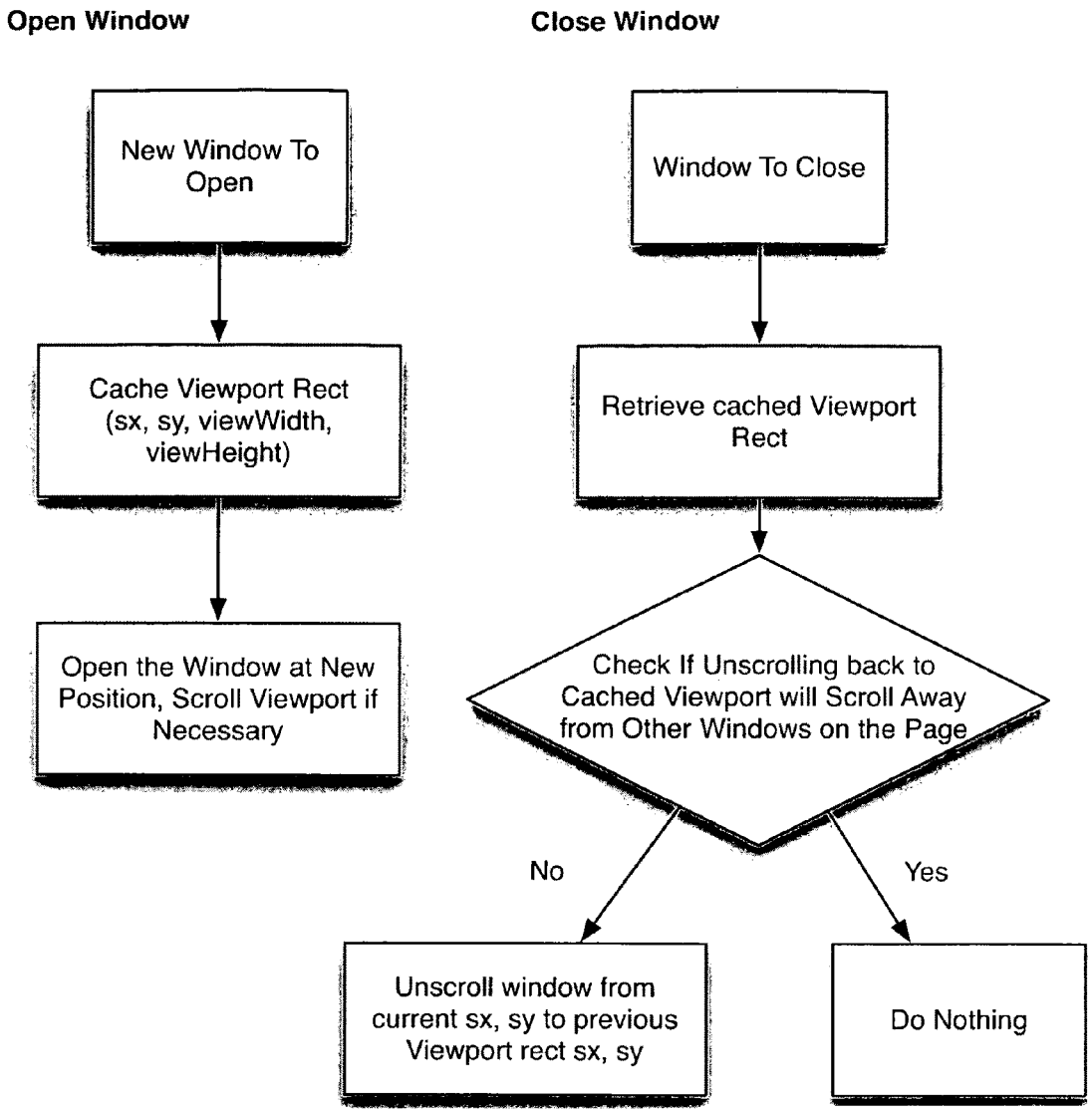
FIG. 4 illustrates a flowchart overview of operations of the layout manager.
Figure 5A:
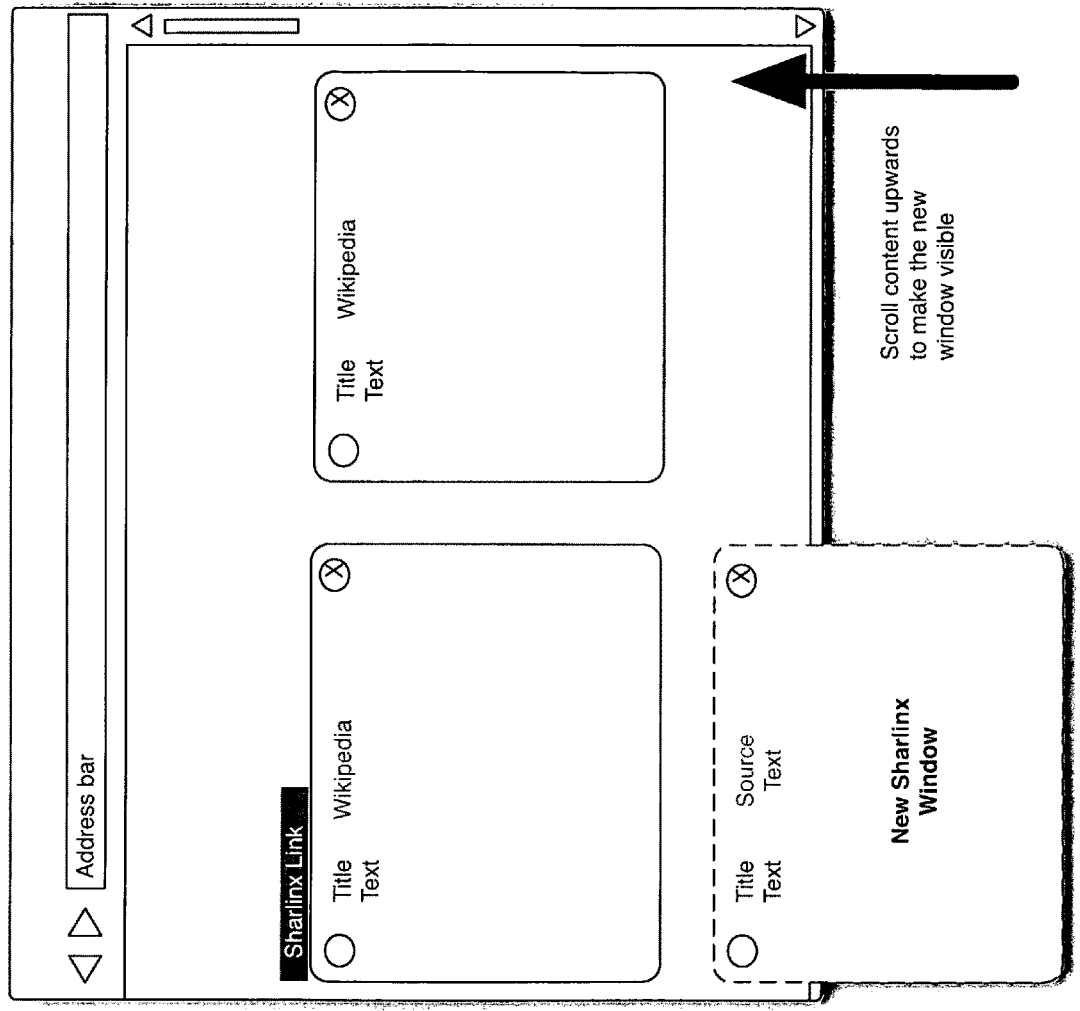
FIGS. 5*a-c* illustrate placement of windows by the layout manager.
Figure 5B:
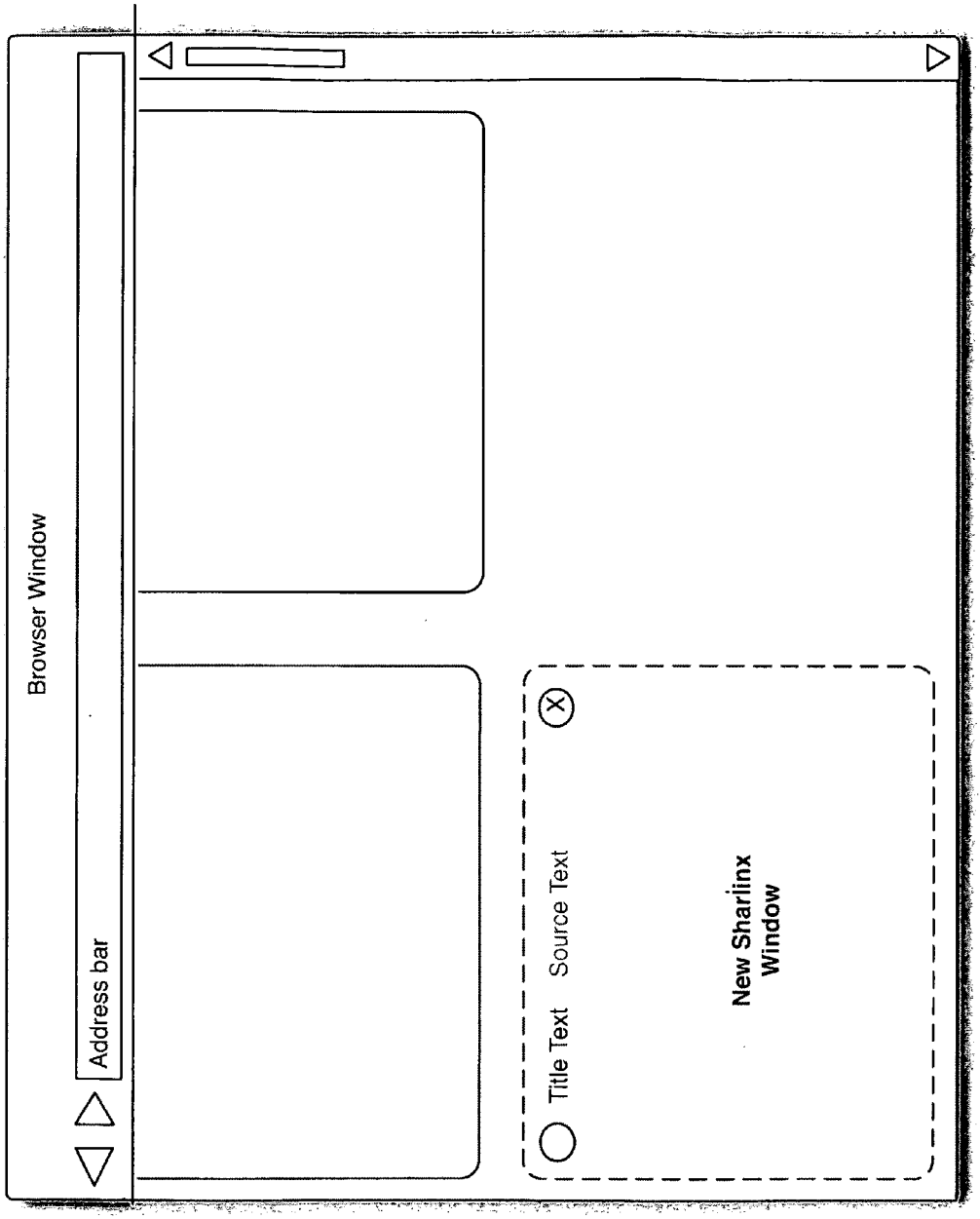
Figure 5C:
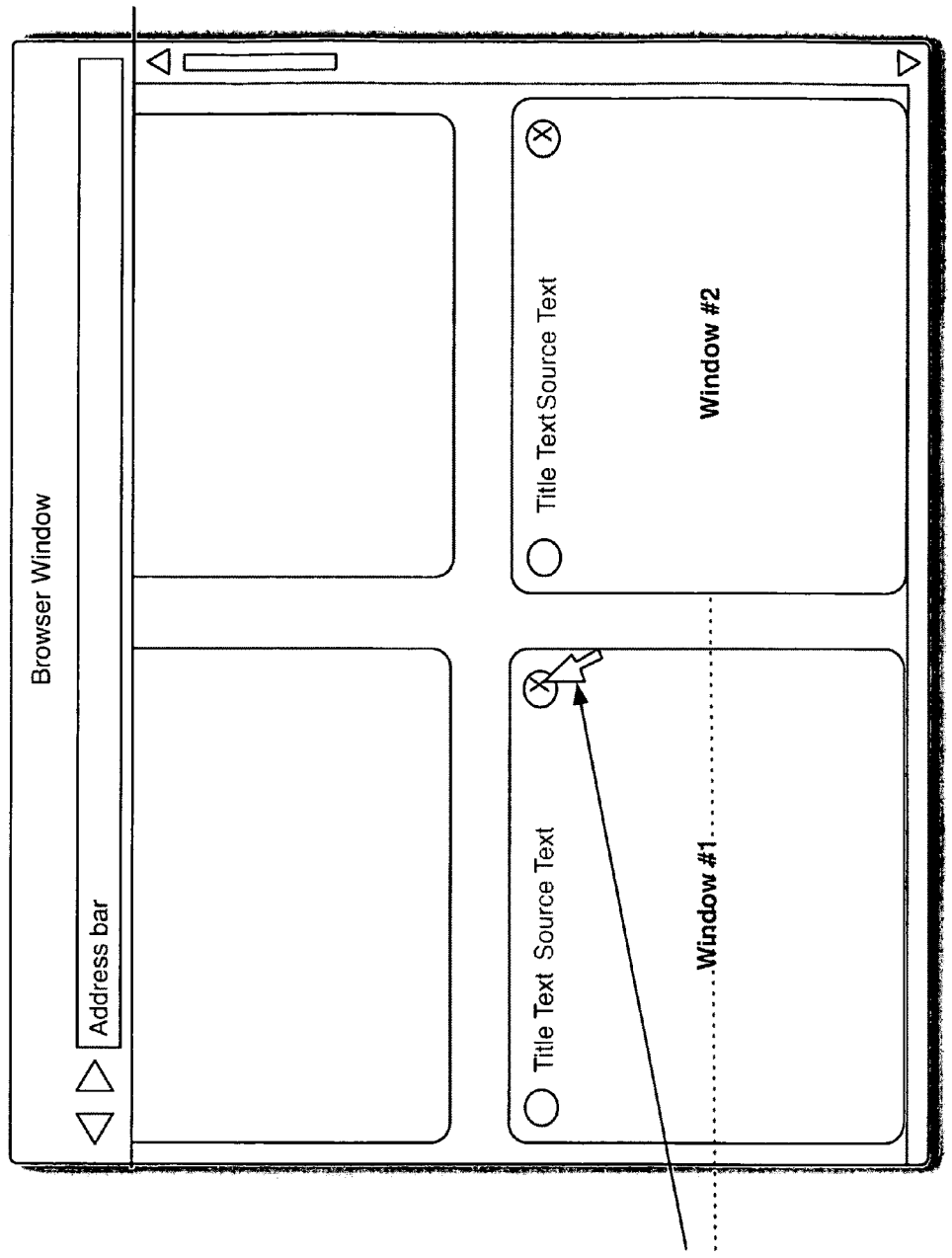

Next, the function in which the window manager intelligently "unscrolls" the viewport when windows are closed is another aspect of the present invention. To be more specific, for any window that scrolled the viewport when first appearing and is now asked to close, the window manager will automatically "unscroll" the browser window back to where it was previously (before the closing window was first opened) because the space occupied by the closing window is no longer necessary. This is done because users of the invention's viewing environment tend to accumulate several windows on the screen over time, and since they are progressively layed out on the screen, unscrolling the viewport when a constrained and extendable windows window is closed will return the users' attention to windows to which they have previously opened, since that is what the user would generally do anyway. There is additional logic, however, so as not to unscroll the viewport when unnecessary. If the media viewing layout manager always unscrolled a closing window, it could actually move the user away from media windows upon which they intended to focus, and this would be annoying. To prevent this, the media viewing layout manager intelligently loops through all the other windows' bounding rectangles and tests if the predicted "unscroll" will actually move the user away from other windows which lie spatially between the closing window and the direction opposite to the "unscroll" direction. If so, the "unscroll" is not performed. For clarity, see FIG. 4 for a Flow Chart of the algorithm, and FIGS. 5a, 5b, and 5c for a visual description. The logic is the following:

When a window automatically scrolls the viewport during open (in the manner described above), the previous scrolled region of the viewport is cached (e.g. the original sx, sy, and sWidth, sHeight). Then, when that window is later asked to close, the system examines every other window contained within the viewport and sees if "unscrolling" would scroll away from these other windows. If so, it prevents the unscroll from happening. If not, the unscroll is performed. For example, if the unscroll direction was upwards and there existed other windows whose "bottom" coordinate (theirY+ theirHeight) was greater than the bottom coordinate of the closing window (y+height), the test passes and the unscroll is not performed. This test's purpose is to avoid scrolling the viewport away from other windows which the user might want to use. If this is not the case, the window manager will perform the "unscroll" back to the previous viewport location. If oldSx and oldSy were the cached top-left coordinates of the previous viewport (before the closing window was opened), and curSx and curSy are the top-left coordinates of the current viewport, then functions are called to start the animation timer as before, and scroll from [curSx, oldSx] and [curSy,oldSy] in parallel.

In the present invention, the window opening and closing animations execute in parallel to the aforementioned "scrolls" and "unscrolls", such that just one timer is simultaneously responsible for the scaling down animation of an opening or closing window and the viewport scrolling animation. The effect is that a window opens towards an off-screen area, and as it is opening, the window scrolls gradually as the window moves to its final position. Other variations include using multiple timers for scrolling the window, or staggering the animations one after another. Both scrolling animation and opening/closing window animation happen substantially simultaneously, and as such the usage of multiple timers can improve performance of the animation.

There are also variations in how to determine whether or not to "unscroll" a closing window, and where to unscroll. In the case of deciding where to unscroll, instead of strictly using the cached scrolled viewport position when a new window is opened, the system could find the next closest cluster of windows on the page (relative to the closing window) by looking at the distance between the windows' centers, and scroll such that one or more of those windows would become visible. The desired effect is automatically bringing the user to the next group of windows with which they want to interact. For example, in the case where it would unscroll to the closest window of the nearest cluster of windows (to the closing window), the system finds the closest window by looping through the windows (in linear or binary traversal depending on if optional geometric sorting was implemented) and examining the distance between each window and the closing window. Once found, the system performs the same "unscroll target" computation, testing the x, y and w, h attributes of the window's rectangle against the current viewport's scrolled offset, and scroll just enough (in the manner described above) to make this window visible. If this computation were to be performed against multiple windows in a cluster, the computation would be performed against the window maximally distant from the closing window (so as to scroll just enough that the furthest window of the cluster of windows would be visible), the window minimally distant from the closing window (so as to scroll just enough that the closest window was visible), or somewhere in between (perhaps the mean or media distance of all the windows from the closing window). One other variation of the system is not to scroll automatically to the previous viewport if the difference between the current viewport and the destination "unscrolled" viewport is minimal (within some epsilon value).

Lastly, if closing a window ever results in leaving space in the viewport no longer occupied by windows or other underlying content in the base viewport, we will also shrink of the overall viewport size (including the non-visible area) to effectively reclaim any unused space that was necessary when the window was first placed, but unnecessary after the window has been closed. The scrollbar extends when new space is granted to the viewport to display new windows that appear outside the bounds, and this method reclaims the unused space by un-extending viewport after the window is closed. We compute the amount to shrink the viewport by subtracting the dimension(s) of the window that occupied the unused space, and subtract that amount from the current viewport size. For example, if a new window appears in the process of scrolling the viewport (in the manner described above) to make the window visible, extends the viewport by 50 pixels which also increases the length of the scrollbar on the viewport. When the window is closed, the "unscroll" is performed, the animations are performed, and at the end of the animations, the extra 50 pixels that are no longer necessary are reclaimed (because no underlying page content or windows would exist in that additional space). The viewport shrinks by 50 vertical pixels, and the scrollbar is shortened (usually automatically by the operating system). While in the case of a web browser it may already be the case that space is automatically granted and reclaimed as windows move beyond the boundaries of the web page's boundaries, that may not always be the case, and does not occur for the operating system's viewports (the desktop for example). Thus, according to the present invention, when no new space is available, the size of the viewport is increased and reclaimed afterwards automatically.

The desired behavior is to do automatically what the user would manually do next, and never to get in the way. As the system is described above, closing a window in the present invention will work to prevent the user from scrolling away from windows they intended to view, and never leave orphan windows or spaces on the screen that are no longer necessary.

It is also important to note that the present invention is directed not only to the animated scrolling of the viewport to accommodate the new window, but the parallel animation that occurs to display the new window.

In the present invention, windows are meant to be laid out as near to each other as possible, and non-occluding so that the user need spend time only to open, close, view and interact with content within the windows, but never manage the windows themselves.

Window Layout

The window layout system according to the present invention is based on a center-oriented tile-based window layout manager like the one Xerox PARC invented in the 1980s, to the extent that the window manager attempts to find an unallocated, non-overlapping rectangle on the screen where it can place new windows. The difference is that the present invention functions within constrained and extendable viewports, and that there are at least some, and preferably all, new windows that open from, and collapse back into, a "parent" or "anchor" element, which results in a "centering" of the placement of new windows around the "parent" element. For example, in the case of text links on a page according to the present invention, a window opens from the center of the clicked link, and a scale animation is performed, interpolating between the "launch" element rectangle (the rectangle of the clicked link) and the destination rectangle of the opening window, determined by the layout manager. Windows open in such a way as to expand from the "parent" item, and the visual scaling animation effect (from small to large, on open of the window, and large to small on close of the window), along with the layout of the window location are crucial to reinforcing this metaphor. Because of this, it is very important that the layout of the windows do as best a job it can to place windows close to their parent item (to better associate them with their parents), while also satisfying other constraints.

To place new windows, the layout manager runs the following algorithm. For a new window with rectangle r of width w and height h, the system loops through are at least some, and preferably all existing "anchor" (existing window) rectangles on the page. For each of these "test" anchor rectangles, we add the following possible "state" or "position" of the rectangle r to a list of results:

- the rectangle to the left side of the test "anchor" rectangle, aligned to the top
- the rectangle to the left side of the test "anchor" rectangle, aligned to the bottom
- the rectangle to the left side of the test "anchor" rectangle, bottom-aligned to the anchor's vertical center
- the rectangle to the left side of the test "anchor" rectangle, top-aligned to the anchor's vertical center
- the rectangle to the left side of the test "anchor" rectangle, center-aligned to the anchor's vertical center
- then, the same as the above five positions, but to the anchor's right hand side
- the rectangle above the test "anchor" rectangle, aligned to the anchor's left side
- the rectangle above the test "anchor" rectangle, aligned to the anchor's right side
- the rectangle above the test "anchor" rectangle, left-aligned to the anchor's horizontal center
- the rectangle above the test "anchor" rectangle, right-aligned to the anchor's horizontal center
- the rectangle above the test "anchor" rectangle, center-aligned to the anchor's horizontal center
- then, the same as the above five positions, but to the bottom of the anchor.

Figure 6:
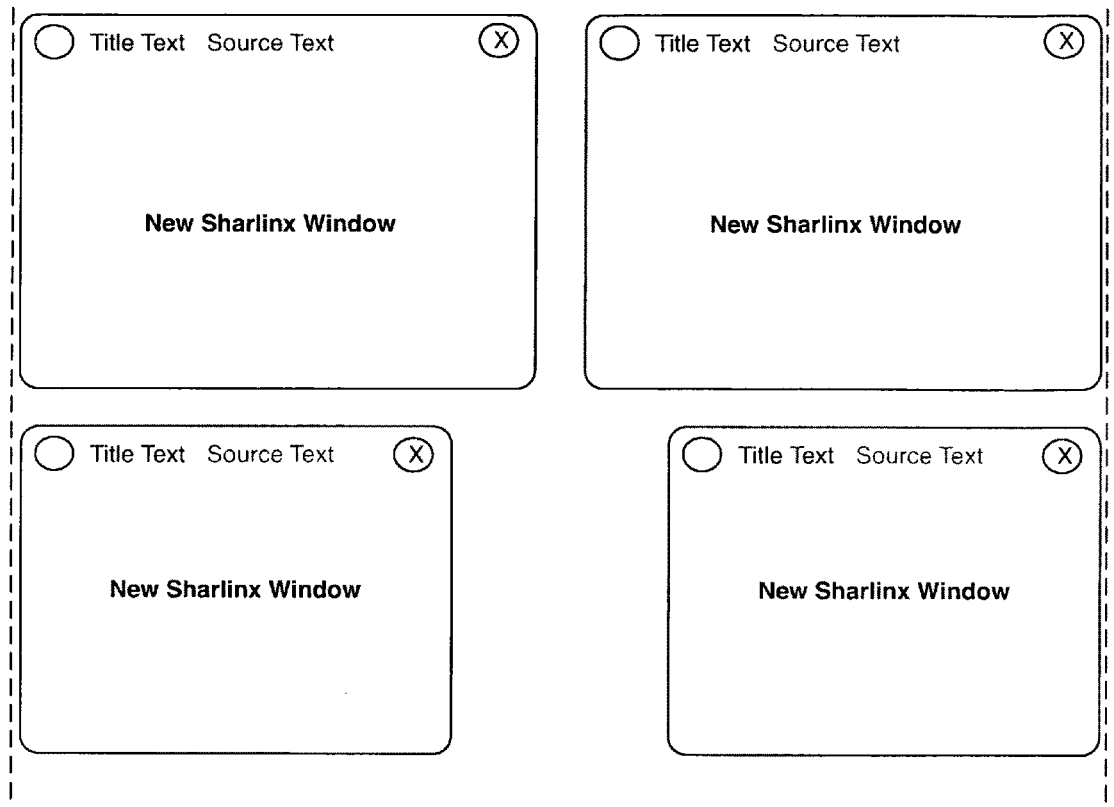
FIGS. 6 and 7 illustrates examples of clean alignment.
Figure 7:
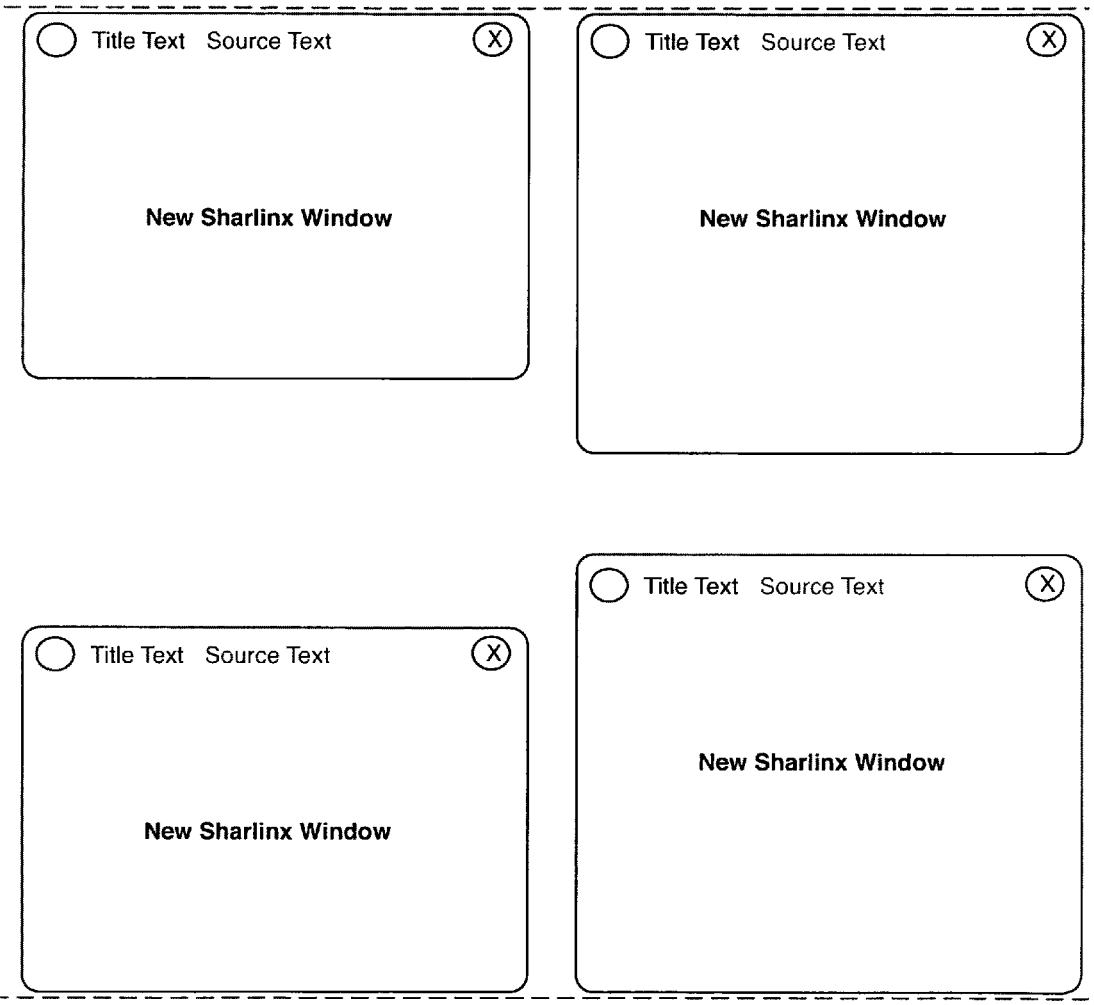

Using this algorithm, every anchor rectangle (in other words, every window) with its 5 positions per side*4 sides yields 20 possible positions to test. More or fewer placements could be tested depending on the granularity desired. After accumulating a list of possible rectangles to ultimately place rectangle r, the system loops through these possible locations and tests to see if the rectangle intersects any "reserved" rectangles on the page (e.g. other windows, iframes, objects, or advertisements). If this is true, and it is wished to treat this intersection as a strict ruling out of the position, this placement for r is no longer considered. After the list has been "filtered" by removing colliding rectangles, the list of placements are then ranked to find an "optimal" position, based on the following heuristics:

- if the proposed position yields a "clean alignment" with the edge of other windows or page elements. "clean" is defined as aligning horizontally or vertically with another window's edge. See FIG. 6 and FIG. 7. The test is such that the x, and y values of the top-left coordinates of each window align either on the horizontal axis or the vertical axis (+/− some epsilon for padding, such that the windows need not exactly line up). If so, we give this placement more points.
- if the proposed position is next to the "parent" constrained and extendable window that was clicked. We compute being "next to" as having a bounding rectangle either to the side of or above/below the "parent" window (within some epsilon), which is computed using standard rectangle calculations. If so, we give this placement more points.
- if the proposed position yields a "dense arrangements" of windows such that the placement is as close as possible to at least some, and preferably all the existing windows on the constrained but extendable page. We implement "dense arrangement" as an approximation by averaging the distance between the center of the window at the proposed location and the centers of all the other windows on the page. This can be implemented as a loop through the centers of at least some, and preferably all the other windows on the page, computing their rectangles and the center points, and then computing the hypotenuse of the line connecting the two center points. We give more points to a window placed closer to the average distance to all the windows, than one placed further away.
- if the proposed position optimizes the amount of "free space" for subsequent windows to appear, such that placing this window at this location will not fragment the screen space such that it will be impossible to cleanly fit a subsequent active window that is opened on the screen. We implement this by approximating the size of future windows, and giving more points to window placements that would leave enough horizontal or vertical space for another window placed alongside it. Because the present invention standardizes the sizes of key types of media (e.g. a Wikipedia and YouTube media are always so-many pixels wide and tall), rough approximations of the size of windows that will be opened by the users in the future can be made. Variations on this include pre-computing and pre-fetching the width and height of other media windows that are available to open at any given time, and use the specific widths and heights of these media specifically to leave enough "free space" for, in the event that they are opened. Overall, this gives more points to placements that yield more "free space" for the layout of subsequent windows.
- if the proposed position optimizes human-focused constraints, e.g. layouts that make more sense to humans by choosing positions that are closest to the user's focal attention point, as close to the source "launch" rectangle location (e.g. the related thumbnail where the user clicked) as possible. This is implemented by giving more points to placements that are closer to the user's last center of attention, which could include the current center of the viewport, or the center of the window last viewed. More likely, this could include giving more points to placements which place the new window close to the "launch rectangle" of the clicked item which produces the window.
- if the proposed position requires scrolling the page to view the placement, add a penalty to considering that placement. This is implemented by seeing if the proposed placement goes beyond the current viewable bounds of the viewport, e.g. if the window's x, y position are smaller than the viewports viewX and viewY, or if x+w>viewX+viewWidth or y+h>viewY+viewHeight. If so, points are deducted for this placement.
- if the proposed location respects (does not occlude) certain "reserved" or "soft-reserved" rectangles on the screen such as advertisements, Flash embed boxes, iframes, or certain images designated by the publisher to not be occluded on the underlying page content (below the windowing layer of the present invention). The reason for avoiding advertisements particularly is that advertisers who pay for a designated rectangle on the web page may not wish other content (e.g. a constrained and extendable window) to appear above their paid space, occluding their content. Secondly, animated Flash multimedia on the page (which also may include advertising) may sometimes draw to the front of the screen irrespective of the z-ordering of the DOM elements, which results in a "flickering" of the underlying Flash content, drawn incorrectly above the constrained and extendable window and other content. Users find this behavior very confusing and the present invention alleviates the problem by positioning windows outside these reserved page rectangles. This is implemented by deducting points for placements of windows which intersect the rectangles on the page for <iframes>, <objects> and <embed> tags, using a standard rectangle intersection algorithm. In addition to simply deducing points for placements which intersect these "reserved" rectangles, additional placements are added to the list of possible placements to test (e.g. the state space, in AI terminology) based on other occupied window rectangles. For example, for every advertisement that's on the screen, we add to the list of possible placements using the same method as described above (for building a list of possible placements around any "anchor" rectangle), resulting in 20 additional positions per advertising rectangle. The effect is that placements are found for the new window that, without using the additional advertising placements would have resulted in not finding a "legal" placement. Using this method, positions are found non-overlapping with windows and advertising on the page, not necessarily next to any existing windows on the screen, yet a legal placement that is near the parent or "anchor" element.

if the proposed position places the rectangle in the opposite direction as the direction from the first opened anchor to all the subsequently opened windows. For example, if from a starting anchor, one window is opened, and from that window, we open two more, and then a fourth is opened. For each window opened, if the windows are placed horizontally and downwards from the original "anchor", at a later time if the overall direction of previously placed windows from the first opened "anchor" is violated, e.g. the downwards direction, points can be subtracted for the placement, or simply call it illegal.

An alternative to the method described above collects the list of possible placements of r is to use a geometric bisection algorithm as found in computer graphics textbooks, which, starting from the occupied rectangles on the page, bisects the space between each side of the rectangle and the remainder of space between it and the first element to collide in that direction. The spaces are subdivided over and over (until some limit of time or depth of subdivisions is announced) and then the found free region resulting in these computations is used to place the rectangles.

The present invention may also use regression testing to re-adjust the weights based on relevance feedback or training data, to ultimately teach (using standard machine learning techniques) the window manager what features (of those heuristics described above) matter most, using weighting values that maximize the desired placement results. This works by feeding in a "state" of a viewport with no windows, repeatedly opening and closing new windows, one after another, and at each step, having a human being manually drag a window to its human-decided "optimal" location and mark this location as the "optimal" location. Once these locations have been marked, the same sequence of opening and closing steps can be replayed and the weights for the various features described above can be re-adjusted automatically by the computer to maximize the placement of the windows towards the human-chosen location. The penalties used to re-weight the system are based on distance metrics from where each window is placed using the current weights, and their distance from the respective "optimal" position.

It is noted that the present invention described herein allow a secure solution for login and editing of a webpage.

Other related disclosures that can be used with the invention described herein are identified asSer. No. 12/321,596, entitled "CREATING FIRST CLASS OBJECTS FROM WEB RESOURCES," filed Jan. 21, 2009, and Ser. No. 12/321,597, entitled "METHOD OF ENABLING THE MODIFICATION AND ANNOTATION OF A WEBPAGE FROM A WEB BROWSER," filed Jan. 21, 2009, both of which are expressly incorporated by reference herein.

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures.

What is claimed is:

1. A method of transforming an appearance of a display of a computer that includes at least one or a plurality of windows displayed in a scrollable viewport, the method of transforming based upon a user commanding the computer to add a new window or to remove an existing window and comprising the steps of:

providing a layout manager that is executed by a processor of the computer and contains a plurality of instructions to cause the computer to automatically arrange placement of the one or a plurality of windows within a representation of an extensible display area of the scrollable viewport stored in a memory wherein a subset of the representation corresponds to a viewable area corresponding to a visually perceptible viewable area of the display associated with the computer, and an extension area corresponds to a non-viewable area of the representation, wherein the layout manager:

creates a log of the one or the plurality of windows and a scrolled offset of the viewable area, and monitors which one of the one or the plurality of windows is an active window, such that any portion of the one active window that is within the visually perceptible viewable area is displayed and other ones of the plurality of windows that are not the one active window are displayed as background windows that are spatially oriented around or behind the one active window, wherein some of the background windows have portions within the visually perceptible viewable area that are behind the active window and are occluded and also portions within the visually perceptible viewable area that are around the active window and are not occluded;

in response to the user commanding the computer to add the new window, the layout manager automatically designating the new window as the active window, positioning the new window within the representation of the scrollable viewport, wherein one or more locations within the representation are reserved as non-occluding locations where no new windows are placed, wherein the positioned new window does not occlude the reserved locations, and wherein the positioned new window occludes at least portions of one or more windows in locations within the representation that are not reserved as non-occluding, and automatically scrolling the representation so that a portion of the new window is within the visually perceptible viewable area; and in response to the user commanding the computer to remove the existing window, the layout manager automatically determining an immediately previous active window and designating the immediately previous active window as the active window, and automatically scrolling the representation so that a portion of the immediately previous active window is within the visually perceptible viewable area.

2. The method according to claim 1, further including the step of the layout manager automatically causing an increase in a size of the representation of the extensible display area stored in the memory in response to the user commanding the computer to add the new window.

3. The method according to claim 1 wherein the new window is clustered around the previous active window in response to the user commanding the computer to add the new window so as to minimize scrolling.

4. The method according to claim 3 wherein the new window is opened in a same scrolling direction that is maintained by the layout manager.

5. The method according to claim 3 wherein the new window and the previous active window are oriented to maximize visibility of the new window and the previous active window.

6. The method according to claim 1 wherein the automatically placing by the layout manager comprises:

penalizing, by the layout manager, certain window placements in deciding placement of the new window in response to the user commanding the computer to add the new window.

7. The method according to claim 6 wherein the penalizing user placements weights a plurality of window positions adjacent the active window when deciding the placement of the new window, and selects a new window position based upon a greatest weight attributed to one of the plurality of window positions.

8. The method according to claim 1 wherein the layout manager only performs vertical scrolling when adding the new window and when removing the existing window.

9. The method according to claim 8 wherein the vertical scrolling is performed gradually.

10. The method according to claim 1 wherein the layout manager does not resize any of the plurality of windows when adding the new window and when removing the existing window.

11. The method according to claim 1 wherein the automatic scrolling causes at least some of the plurality of windows that are not the active window to be further moved from the visually perceptible viewable area on the representation.

12. The method according to claim 1 wherein the new window is placed entirely within the visually perceptible viewable area.

13. The method according to claim 1 wherein the immediately previous active window is scrolled to entirely within the visually perceptible viewable area only if the other plurality of windows are not further removed from the visually perceptible area.

14. The method of claim 1, wherein the representation includes a webpage with one or more reserved locations and one or more not reserved locations for the new window, and wherein the new window is positioned within the representation to occlude one of the not reserved locations and positioned not to occlude any of the one or more reserved locations.

15. The method of claim 1, wherein the scrollable viewport is a browser window.

16. The method of claim 1, wherein the scrollable viewport is an application window.

17. The method of claim 1, wherein at least one of the reserved locations includes a portion of the representation configured to display an advertisement.

18. A system for transforming an appearance of a display of a computer that includes at least one or a plurality of windows displayed in a scrollable viewport in response to a user command to add a new window or to remove an existing window, the system comprising:

a memory storing a representation of an extensible display area of the scrollable viewport, wherein a subset of the representation corresponds to a viewable area corresponding to a visually perceptible viewable area of the display associated with the computer, and an extension area corresponds to a non-viewable area of the representation;

a processor configured to execute a layout manager causing a placement of the one or a plurality of windows within the representation, wherein the layout manager, upon the execution, is configured to:

create a log of the one or the plurality of windows and a scrolled offset of the viewable area, and monitor which one of the one or the plurality of windows is an active window, such that any portion of the one active window that is within the visually perceptible viewable area is displayed and other ones of the plurality of windows that are not the one active window are displayed as background windows that are spatially oriented around or behind the one active window, wherein some of the background windows have portions within the visually perceptible viewable area that are behind the active window and are occluded and also portions within the visually perceptible viewable area that are around the active window and are not occluded;

wherein the layout manager, in response to the user command to add the new window, is configured to:

automatically designate the new window as the active window, positioning the new window within the representation of the scrollable viewport, wherein one or more locations within the representation are reserved as non-occluding locations where no new windows are placed, wherein the positioned new window does not occlude the reserved locations, and wherein the positioned new window occludes at least portions of one or more windows in locations within the representation that are not reserved as non-occluding, and automatically scroll the representation so that a portion of the new window is within the visually perceptible viewable area; and wherein the layout manager, in response to the user command to remove the existing window, is configured to:

automatically determine an immediately previous active window and designate the immediately previous active window as the active window, and automatically scroll the representation so that a portion of the immediately previous active window is within the visually perceptible viewable area.

* * * * *